(12) United States Patent
Mann et al.

(10) Patent No.: US 11,836,557 B2
(45) Date of Patent: Dec. 5, 2023

(54) SYSTEMS AND METHODS FOR FOREIGN MATERIAL EXCLUSION ACCOUNTABILITY

(71) Applicant: ACCESS SOLUTIONS, LLC, Molalla, OR (US)

(72) Inventors: Kelvin D. Mann, Mololla, OR (US); Eric Bergstrom, Silverton, OR (US); David Hansen, Newberg, OR (US); Nikolas Tripp, Oregon City, OR (US); Nathan Smith, Albany, OR (US); Stephen Lauser, Portland, OR (US); Matthew Montgomery, Tumwater, WA (US)

(73) Assignee: Access Solutions, LLC, Molalla, OR (US)

(*) Notice: Subject to any disclaimer, the term of this patent is extended or adjusted under 35 U.S.C. 154(b) by 0 days.

(21) Appl. No.: 17/831,943

(22) Filed: Jun. 3, 2022

(65) Prior Publication Data
US 2022/0309300 A1     Sep. 29, 2022

Related U.S. Application Data

(63) Continuation of application No. 16/827,424, filed on Mar. 23, 2020, now Pat. No. 11,379,702, which is a
(Continued)

(51) Int. Cl.
*G06K 17/00*      (2006.01)
*G06K 19/07*      (2006.01)
(Continued)

(52) U.S. Cl.
CPC ... *G06K 17/0022* (2013.01); *G06K 19/06028* (2013.01); *G06K 19/06037* (2013.01);
(Continued)

(58) Field of Classification Search
None
See application file for complete search history.

(56) References Cited

U.S. PATENT DOCUMENTS 5,665,951 A * 9/1997 Newman .............. G06Q 10/087
                                                        235/375
6,324,287 B1 * 11/2001 Angert .................. H04L 9/0662
                                                        380/42

(Continued)

FOREIGN PATENT DOCUMENTS

GB             2465807 A *  6/2010 ............... B25H 3/02

*Primary Examiner* — Fekadeselassie Girma
(74) *Attorney, Agent, or Firm* — FisherBroyles, LLP

(57) ABSTRACT

A system for foreign material accountability includes a kiosk, which further includes a touch enabled display screen that is back-lit and automatically adjusts brightness based on ambient environment. A user input device, wherein the user input device includes a pin pad, one or more sensors selected from a group consisting of temperature sensors, RFID sensors, IR sensors, optical sensors, iris sensors and one or more cameras, a processor, a data bus coupled to the processor and a computer-usable medium embodying computer code operating on the kiosk. The computer code includes programmed instructions executable by the processor to control accessibility of items into a restricted area based on data received from at least one of the display screen operated by a user, the user input device, and the one or more sensors.

14 Claims, 9 Drawing Sheets

Related U.S. Application Data continuation of application No. 16/246,283, filed on Jan. 11, 2019, now Pat. No. 10,635,956.

(60) Provisional application No. 62/616,344, filed on Jan. 11, 2018.

(51) Int. Cl.
  *G06K 19/06* (2006.01)
  *G07C 9/00* (2020.01)
  *G08B 21/24* (2006.01)
  *G07C 9/28* (2020.01)

(52) U.S. Cl.
  CPC ..... *G06K 19/0723* (2013.01); *G07C 9/00912* (2013.01); *G07C 9/0069* (2013.01); *G07C 9/00563* (2013.01); *G07C 9/28* (2020.01); *G08B 21/24* (2013.01)

(56) References Cited

U.S. PATENT DOCUMENTS

| | | | | |
|---|---|---|---|---|
| 6,378,142 | B1* | 4/2002 | Gray | A47K 11/02 4/449 |
| 7,124,041 | B1* | 10/2006 | Johnson | G05B 9/02 702/58 |
| 8,312,660 | B1* | 11/2012 | Fujisaki | F41A 17/08 455/457 |
| 8,928,454 | B2* | 1/2015 | Brown | G07C 9/28 340/568.1 |
| 8,947,201 | B2* | 2/2015 | Crigger | G07C 9/37 340/5.2 |
| 9,326,267 | B1* | 4/2016 | Fujisaki | H04W 4/023 |
| 9,396,599 | B1* | 7/2016 | Malhotra | H04W 12/08 |
| 9,740,381 | B1* | 8/2017 | Chaudhri | G06F 3/0482 |
| 9,907,380 | B2* | 3/2018 | Reh | A45C 13/18 |
| 10,326,922 | B2* | 6/2019 | Wexler | G06F 1/188 |
| 10,635,956 | B2* | 4/2020 | Mann | G07C 9/00896 |
| 11,250,535 | B1* | 2/2022 | Bai | H04N 1/32352 |
| 2004/0251304 | A1* | 12/2004 | Carmon | G06K 17/0022 235/382 |
| 2006/0015233 | A1* | 1/2006 | Olsen | G07C 9/28 701/2 |
| 2008/0303670 | A1* | 12/2008 | Seidel | G08B 13/2448 340/572.1 |
| 2010/0018088 | A1* | 1/2010 | Rajpal | G09F 27/00 40/5 |
| 2012/0143383 | A1* | 6/2012 | Cooperrider | H05B 47/175 700/295 |
| 2012/0190455 | A1* | 7/2012 | Briggs | A63F 13/48 463/42 |
| 2013/0222756 | A1* | 8/2013 | Van Heugten | G02B 5/1828 349/200 |
| 2013/0327675 | A1* | 12/2013 | Stephens | A47K 10/20 206/494 |
| 2014/0157794 | A1* | 6/2014 | McGann | F25D 11/003 62/3.2 |
| 2014/0223313 | A1* | 8/2014 | Aebi | G06F 3/0488 715/733 |
| 2014/0266584 | A1* | 9/2014 | Ingle | G07C 9/00912 340/5.28 |
| 2014/0266760 | A1* | 9/2014 | Burke, Jr. | G16H 20/13 340/687 |
| 2015/0135021 | A1* | 5/2015 | Robison | H04W 12/068 714/55 |
| 2015/0135298 | A1* | 5/2015 | Robison | H04W 4/029 726/19 |
| 2015/0145643 | A1* | 5/2015 | Fadell | G08B 29/185 340/5.51 |
| 2015/0268748 | A1* | 9/2015 | Ge | G06F 1/1643 345/173 |
| 2015/0269880 | A1* | 9/2015 | Ge | G09G 3/2003 345/690 |
| 2016/0042633 | A1* | 2/2016 | Lin | H04M 1/72516 340/686.6 |
| 2016/0055697 | A1* | 2/2016 | Raina | G07C 9/15 340/5.7 |
| 2016/0082173 | A1* | 3/2016 | Coll | A61M 1/1565 604/114 |
| 2016/0139803 | A1* | 5/2016 | Yan | G06F 3/0216 715/773 |
| 2016/0267760 | A1* | 9/2016 | Trani | G07C 9/28 |
| 2016/0284147 | A1* | 9/2016 | Trani | G07C 9/27 |
| 2016/0284183 | A1* | 9/2016 | Trani | H04W 4/33 |
| 2016/0313902 | A1* | 10/2016 | Hill | G06F 3/0482 |
| 2017/0300728 | A1* | 10/2017 | Feng | G06K 19/06037 |
| 2018/0091641 | A1* | 3/2018 | Trani | G07C 9/28 |
| 2018/0224151 | A1* | 8/2018 | Froehlich | F25D 29/003 |
| 2018/0244404 | A1* | 8/2018 | Park | G06Q 10/0836 |
| 2018/0336758 | A1* | 11/2018 | Scott | G07F 17/3211 |
| 2019/0038062 | A1* | 2/2019 | Sundaresan | A47G 29/124 |
| 2019/0130348 | A1* | 5/2019 | Mellado | G07C 9/00571 |
| 2019/0187643 | A1* | 6/2019 | Carpenter | H04W 4/38 |
| 2019/0213455 | A1* | 7/2019 | Mann | G06K 19/0723 |
| 2019/0265792 | A1* | 8/2019 | Wu | G02B 27/0172 |
| 2020/0076866 | A1* | 3/2020 | Wu | H04N 21/854 |

\* cited by examiner

SYSTEMS AND METHODS FOR FOREIGN MATERIAL EXCLUSION ACCOUNTABILITY

CROSS-REFERENCE TO RELATED APPLICATIONS

This application is a continuation of U.S. application Ser. No. 16/827,424 filed Mar. 23, 2020; which application is a continuation of U.S. application Ser. No. 16/246,283 filed Jan. 11, 2019; which application is related to and claims priority from U.S. Provisional Application No. 62/616,344, filed on Jan. 11, 2018; the contents of the above-referenced applications are hereby incorporated by reference as if fully set forth herein.

COPYRIGHT NOTICE

This disclosure is protected under United States and/or International Copyright Laws. © 2022 ACCESS SOLUTIONS, LLC. All Rights Reserved. A portion of the disclosure of this patent document contains material which is subject to copyright protection. The copyright owner has no objection to the facsimile reproduction by anyone of the patent document or the patent disclosure, as it appears in the Patent and/or Trademark Office patent file or records, but otherwise reserves all copyrights whatsoever.

FIELD OF THE DISCLOSURE

This disclosure relates generally to Foreign Material Exclusion (FME) accountability and, more specifically, to FME accountability at power plants and other industrial settings.

BACKGROUND

In high risk environments, such as power plants, leaving foreign materials behind after completion of work can be catastrophic. Foreign materials left in certain locations, such as in controlled industrial areas, can result in critical failure of components, leading to injury or even death of plant personnel, and or require temporary shut down and repair of the plant. Leaving something as seemingly trivial as a rag behind may quickly become a multi-million dollar problem. Because of the high risk of disaster resulting from foreign material, regulatory requirements now require sufficient Foreign Material Exclusion (FME) Accountability practices. This has added an additional layer of complexity to operation of these facilities. A failed audit can also result in plant shutdown, again costing plant operators huge sums of money. Prior FME techniques generally rely on staging personnel at entry points, and tasking them with manually tracking who and what enters and leaves an area. Conventional systems employing the FME techniques require users to use a separate mouse and a keyboard. Touchscreens of such systems that are claimed to work with gloves quickly become unreliable in the greasy, humid, dusty environments. Further, content present on monitors of the conventional systems is not easily readable due to insufficient brightness. Thus, conventional FME systems and techniques are inefficient, and prone to error.

SUMMARY

Described herein are systems and methods that provide an increased level of information, assurance, and accountability, with respect to FME accountability. The method and system described herein ensures that all foreign material that enters a restricted area also leaves the restricted area. Further, the method and system are tailored to the realities of the workplace, are intuitive, and provide layers of redundancy thereby increasing usability, efficiency, and safety. This novel system and method incorporates highly featured automated kiosks, improves item and personnel tracking, and other accountability procedures which, when combined, provide the most information possible to personnel in charge of FME procedures and prevent critical items being used in the controlled areas (restricted areas) and remain accounted for through the entire process.

To provide some history and perspective, every twelve to eighteen months power generation companies schedule planned outages of their power generation operations to disassemble, inspect, maintain, upgrade as applicable and then reassemble the main components of the power generation process. The critical components of such process consist of some form of heat source (e.g., nuclear reactor, coal or gas fired boiler, etc.), high and low pressure turbines, combustion turbines, generators, exciters and/or condensers. Over time, the increased pressure on getting more and more things done in shorter and shorter timeframes results in a dramatic increase in unplanned outages caused by foreign objects being left in machines during such outage projects that cause significant damage and safety risk once restarted.

Documented field operating experience reveals that the most common cause of unplanned outages resulting from foreign material intrusions, are from tools, plastic bags, rags, animals and debris left undetected in machines during reassembly. While the problem may seem quite trivial, the cost to power plants is often staggering due to the time and costs required for new parts to be manufactured, shipped and installed. The lead time alone for the major components of power plants can be many months. The expense to mobilize outside vendors to perform the repairs is always greater during rush projects. The largest expense caused by foreign objects left behind is typically loss of revenue. Each power generation unit of a typical nuclear power generation plant can produce over one million dollars per day in revenue.

The FME accountability process was developed in the 1970's to avoid serious damage caused to the critical components due to any type of foreign material entering these systems. The process involved creating a work area surrounding each of the critical components with one way in and out of each area and by adding at least one person stationed at such gate to record everything going in and out. Again, the objective was to account for and remove everything not intended to remain during assembly or maintenance to assure the machine operated properly when re-energized.

FME continues to be of critical importance in today's workplace. For example, the combustion turbine market has rapidly expanded due to the low cost of natural gas and due to negative public perception of nuclear and coal-fired power, and with it, the need for innovative FME practices.

One area that has seen little to no meaningful development in FME is automation. The prior art continues to rely heavily on humans to manage other humans, for example, to help ensure accountability and security. Automation simply has not been a priority in the market.

As described herein, a sophisticated and fully featured FME kiosk automates a number of FME tasks, while providing additional information, reporting, item and or personnel tracking and accountability. For example, in various embodiments, the described FME kiosks can be placed at multiple access points to the controlled area. In various embodiments, many of which are described further herein, the FME kiosk is comprised of a custom software suite, which automates select accountability procedures, and which communicates with other hardware components, such as cameras, sensors, and the like, in order to create a comprehensive log or account of who and what is entering, and returning, from controlled areas.

One of the problematic areas of assuring nothing gets left in machines is combatting the human component of the maintenance process. The workers performing the work in general are pressured to sustain a safe but efficient pace of getting the work done. When things go missing, it is not uncommon to have the items "appear" while uncertainty remains over whether the item found, was the item lost. In various preferred embodiments, Access Solutions' novel system and method assures that all items are clearly described, illustrated and labeled so that if/when lost, those tasked with finding lost items know exactly what to look for and when found, there are no questions on whether the item found was the item lost. For example, all items may be individually tagged or marked, using RFID, or laser etching, for example. When integrated with automated features, the system, and plant personnel, can be sure, that the item recovered, was the item lost. One component of the system and method described herein, is the ability to appropriately and reliably tag items being used in the work area. For example, in various embodiments tool tethers are used which can communicate with the system. In other embodiments, every item which enters the restricted area is in communication with the system, for example, plastic sheeting may have an RFID embedded in it, and worker clothing may include snaps which contain an RFID chip capable of communicating with the FME kiosk. Various items may also have permanently marked and/or lasered numbers or labels. This integration with the automated system allows for total control and knowledge of the materials that enter and leave the controlled area.

BRIEF DESCRIPTION OF THE DRAWINGS

The accompanying drawings illustrate various embodiments of systems, devices, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

The methods and system described herein are designed to achieve 100% foreign material accountability while also processing workers through the process efficiently and effectively.

Figure 1:
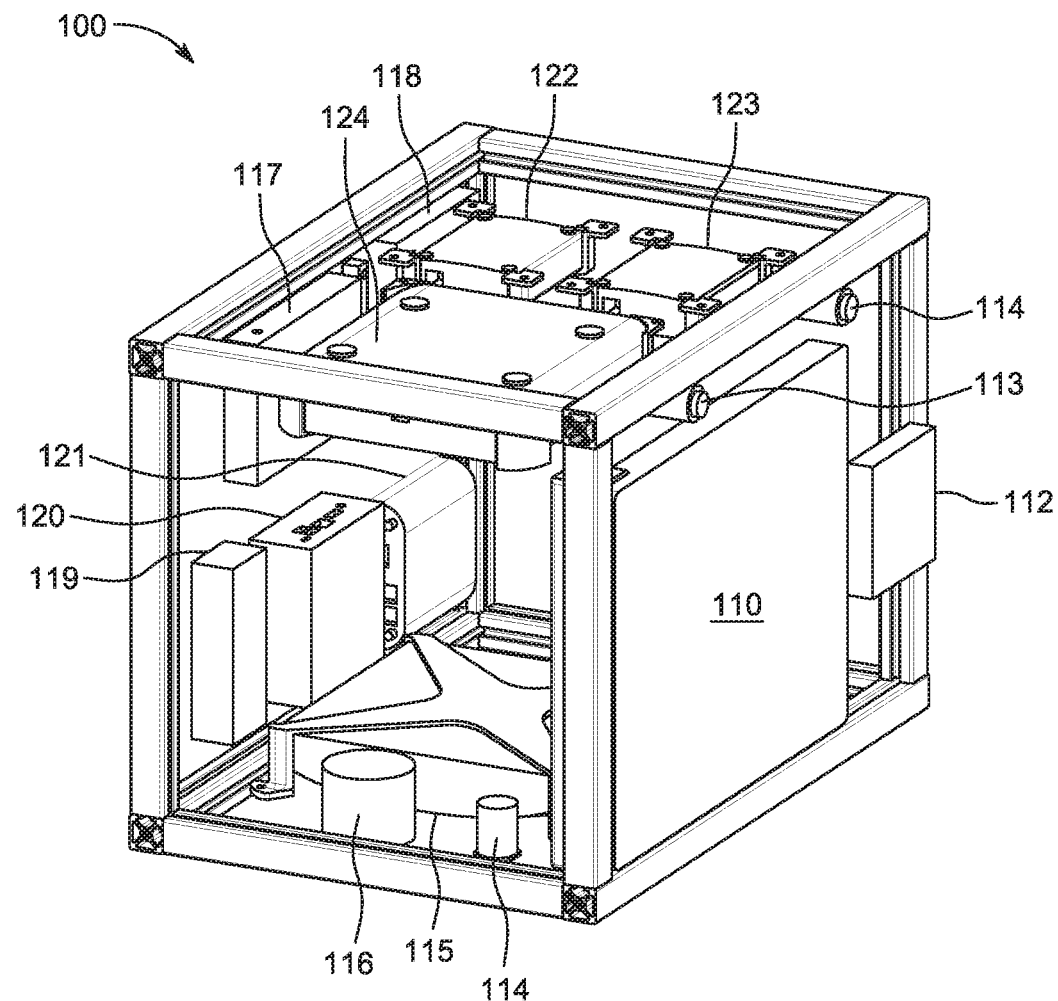
FIG. 1 illustrates a perspective view of an FME kiosk 100, in accordance with an embodiment of present disclosure.

In accordance with various examples, a Foreign Material Exclusion (FME) kiosk is provided. A perspective view of the FME kiosk 100 is illustrated in FIG. 1. The FME kiosk preferably includes a user interface. In various embodiments, the user interface may be easily accessible and usable by workers wearing work gloves. As many embodiments of the system described herein may be targeted for use in the Radiologically Controlled Area of power plants, all workers must have gloves on at all times. This being the case, various embodiments of the present disclosure provide color-coded keys and a numerical keypad that a user can use to navigate through the check in/check out process. These embodiments also allow for the use of a high quality back-lit monitor that could be easily viewed in direct sunlight. While various embodiments use colored keys to navigate the check in/check out process and to pull reports, various embodiments may also employ, either additionally, or separately, predicting that touch screen technology will continue to progress, touch screen ready capability.

The FME kiosk 100 of FIG. 1 is depicted schematically, and for purposes of clarity, is shown in an open configuration with side panels removed from its frame. As discussed further herein with regard to various embodiments, the FME kiosk 100 includes interconnected components acting together to provide functionality in accordance with the present invention. Components of the kiosk 100, include a touchscreen or monitor 100, keypad 112, a still face camera 113, multiple (in the case of one particular embodiment—two (2)) video cameras 114, an RFID reader/scanner 115, a still desk camera 116, power distribution blocks 117, 118, a light controller/relay 119, a computer 120, router 121, power-over-ethernet (POE) switch 122, a keyboard-video-mouse (KVM) switch 123, and a network video recorder 124.

In accordance with still further examples, each FME kiosk may check in and pull information needed for each project from a cloud-based central administration system consisting of a master database of customers, customer authorized personnel (project managers, engineers and supervisors), customer procedure forms, known authorized entrants and all trackable items provided by a third party and/or items that have numbers etched onto them using any method known in the art, for example, a laser or chemical etch.

In accordance with yet other examples, a plurality of other FME kiosks may operate on a standalone basis, or may be connected to a central server through a wired or wireless network, such as a Local Area Network (LAN) or the internet. When all the kiosks are connected with each other, all items are tracked within and between FME controlled areas and tool cribs. This alone will increase worker efficiency. For example, when the FME kiosks are used, multiple gates can be established and used to access FME controlled areas. One benefit of the described system is that the FME kiosks can communicate with each other in real time, and can update accessible lists in real time. For example, should Person 1 and Tool 1 enter at Gate A, and Person 2 and Tool 2 enter at Gate B, FME kiosk A and FME kiosk B will both independently register the entry of the corresponding person and tool, that data is then uploaded to a central location (or centrally accessible), accessible by either kiosk, and by plant personnel, providing a complete and accurate picture of the current people and objects in the restricted area at any given time.

In various embodiments, the FME kiosk may communicate with other components at a worksite. For example, a FME kiosk may communicate with an electronic door latch or gate in order to prevent or grant access to the door or gate. Alternatively, the FME kiosk may communicate with various other components, such as lights, speakers, alarms, video monitors, security cameras, PSTN, Internet etc. The FME kiosk can thereafter control, as necessary, various functionalities to increase the level of automated control over access.

In accordance with still another example, the kiosks may also be equipped with cellular capabilities for sites that are within the applicable carriers' areas but cannot provide Internet access to the kiosks. The kiosks, whether operating on a WLAN, wired connection, or cellular connection, are capable of the same feature set. In various embodiments, the type of network is selectable by the user, or the person setting up the kiosk, or, alternatively, the kiosk may automatically choose whichever network is determined to be more reliable, or may rely on more than one network, including different types of networks, e.g., wired and cellular, at the same time in order to carry out the methods described herein.

In accordance with still further examples, the FME Sentry system, including the FME kiosk 100, may be self-reliant and sufficient. In such embodiments, the FME system, including the kiosk and other components, may operate independently and avoid having to load and rely on one of the traditional database systems (SQL Server, Oracle, etc.) to operate properly. In some aspects, an FME kiosk may store executable code or instructions locally to operate in the case of a power outage or other potential security breach or power failures.

In accordance with yet another example, the FME kiosk 100 operating system may be specifically designed so that no training is necessary for the onsite and pre-named onsite administrators to set up the systems and for the authorized entrants entering and exiting the restricted areas i.e. the FME controlled areas. Power plants hire multiple companies to enter and perform work in FME controlled areas. Having to train workers on using a complex system simply reduces the reliability that the system will be used and/or used properly. The FME kiosk 100 may guide the user through each and every process in a step by step manner. Further, additional, or project specific tasks can easily be uploaded onto the FME kiosk. For example, if a job site requires a reflective vest, the FME kiosk operating system can prompt the user to stand in front of the camera, which will scan for the appropriate clothing, before allowing the user to continue to the next screen. The system can easily be configured for each user and use case. For example, in some examples, the FME kiosk 100 may also provide multilingual support. For example, according to this embodiment, when each entrant registers with the system, the system may prompt the registrant to select their language. Once selected, all screens are then presented using the language selected from that point forward. In additional embodiments, the user may have an identifiable tag, which can communicate with, or be identified by the FME kiosk 100. In this case, the user's profile and information may already be associated with the identifiable tag, and may automatically load onto the FME kiosk without specific prompting from the user. For example, a tag may indicate that the user prefers the French language, and may automatically switch to French.

In accordance with further examples, the system and method may provide verification that each entrant is authorized to enter the applicable FME controlled area. For example, power plants require that workers need to be authorized to enter FME controlled areas. During all project mobilization processes, specific workers are trained and then authorized to work in FME controlled areas. According to various embodiments, during a training process, for example, each person may be provided with a small sticker that may contain an RFID tag. The person may be further instructed to place the sticker on the inside front of their hard hats, uniform, or anywhere else on their clothing. Some plants do not require the formal participation in a pre-job brief prior to entering FME controlled workers. This is especially true for workers that arrive to power plants after the projects have started and that have worked in FME controlled areas in the past. The present disclosure accounts for this. In embodiments where an entrant makes it all the way to an FME kiosk without first obtaining an RFID tag, the kiosk may, for example, send a notification text message to the pre-named onsite engineer who replies with an authorization or denial, and or where the FME kiosk offers the entrant a unique RFID tag, and may prompt them to enter information to be associated with that tag (reader/scanner 115). According to this example, once authorized, the FME operating system guides the entrant through the process of taking their pictures and allowing entry. In various other embodiments, the kiosk may send or notify other individuals, and use various other means. For example, the kiosk may sound an alarm, and automatically prompt the entrant to place the RFID tag on their clothing before allowing entry, or, before allowing the entrant to continue with the process of taking their pictures and allowing entry. In other examples, the tag may indicate the level of security clearance, specify access to one or more locations or areas, etc. Where multiple perimeters are established, the FME kiosk 100 may actively prevent users from continuing into areas where they are not permitted. This sort of information can be updated, and accessed in a database accessible by the FME kiosk over the various available networks. In further examples, the user or entrant may simply enter their name or ID number (via e.g., keypad 112), which when entered, prompts the FME kiosk 100 to reference a database of corresponding names and IDs, each of which contains accessibility information.

In accordance with still further examples, unique symbologies other than an RFID tag may be used. For example, users may be prompted to apply a decal, a barcode, or a Quick Response (QR) code to their clothing, such that the Kiosk can read such unique symbologies. In much the same manner as described above, should the Kiosk detect that the entrant does not possess the proper decal or code, access would be denied, and/or a notice or alert may be sent to a supervisor and potentially provide that person with the ability to allow or deny entrance to the person. This embodiment may be combined with other embodiments. For example, all workers may be given RFIDs which provide access to the controlled environment; however decals and codes, or additional or different RFIDs may be used to control access to other areas, or additionally restricted areas.

In accordance with additional examples, the FME Sentry system may also, or alternatively, accept badge numbers entered to confirm that the person attempting to enter is so authorized. Alternatively, where the FME kiosk 100 includes cameras 113, 114 (or retina scanners, finger print identification, etc.), the FME kiosk may also use biological recognition features which allow or deny access based on the identity of the user.

In accordance with yet other examples, the FME kiosk 100 provides verification that the condition of each item used in an FME controlled area at exit is the same as it was upon entrance. This is achieved, for example, in the background when workers are checking their tools in and out. The check in and out procedure may entail, for example, still pictures and/or full motion video captured during each and every transaction. In various embodiments, a worker may scan in tools. Further, the system, using cameras and sensors, such as RFID sensors, can detect if and when an entrant is attempting to enter the restricted area without first registering a tool appropriately. Alternatively, tool registration may be fully automated during a scanning process, where the user simply arranges themselves and their tools in the appropriate manner, for example within view or range of a camera and/or other sensors, while the FME kiosk determines the exact objects entering the facility. Upon exit, the same process occurs, and the FME kiosk 100 cross references the earlier data. Additional benefits of the present disclosure are particularly useful when tools are returned damaged to the tool crib(s). It is not uncommon for work to be stopped to determine if parts went missing from tools while being used in FME controlled areas. The above process gives the site personnel the ability to expeditiously verify and determine this.

In accordance with other examples, tool crib(s) or tool storage areas or containers can communicate with the FME kiosk 100. For example, sensors in the Tool Crib, such as mass sensors and Infrared (IR) sensors, can determine whether or not the tool returned is, for example, lighter than it should be. This information can be sent to the FME kiosk 100, and the FME kiosk can alert necessary parties, as well as determine who the last person was to use that tool, etc. Further, the FME kiosk can cross reference the tool crib(s) attendance list to determine whether or not an item that may be listed as lost, is actually already returned, for example if two users were to trade items while inside a restricted area.

In accordance with other examples, FME barriers and critical items are all tracked. The items that are most commonly being left in critical work areas at combustion turbine projects, for example, are rags, plastic bags and various items used to plug holes known as FME barriers. According to various embodiments, the system and method provide for all items used as barriers to be RFID-enabled and when RFID-enablement is not possible, that all items be clearly and permanently labeled. Items already present in the field may be RFID enabled, or reliably marked, or alternatively, new items may be purchased or provided that are RFID enabled, or reliably marked. In various embodiments, products may be reliably marked by, for example, a laser system that permanently places numbers onto the object. For example, numbers may be engraved into metal FME barriers most commonly used to plug hydrogen lines. These products can then communicate with, and be tracked by the FME kiosk.

In accordance with still other examples, The FME Sentry system tracks the direction each entrant is going as well as each and every item being checked into and out of FME controlled areas. Direction discrepancies are verified at the FME kiosk and reports are generated and proactively delivered according to those specified by the system administrator at the onset of each project. In various embodiments, an FME Accountability Technician, or other desired party, may be included in the notification process where Internet access is provided. According to this and other embodiments, the FME kiosk may be in communication with a broader security network and/or a network of sensors. This can allow the FME kiosk to track and record the movements of users. This can be useful to determine where to look for lost items, or for various other uses.

An additional benefit to the present disclosure is its ability to comply with existing procedures at work sites. For example, formal written procedures are traditionally required for all work activities conducted at power plants. Embodiments provide documented methods and procedures for authorizing entrants and for all tools, materials and items taken into and removed from FME controlled areas. However, introducing new formats for forms may require the power plants to first stop and amend their procedures to introduce the new formats of new forms. One benefit of the present disclosure is that reports generated from the system use the formats already defined according to the system's and the customers' procedures. For example, as described above, the operating system of the FME kiosk can be updated to be site specific, or to produce reports that correspond with site specific guidelines, and format.

In accordance with still further examples, the FME Sentry system verifies that each person attempting to enter an FME controlled area is authorized to enter. FME Sentry also navigates various processes based on types of tools or materials that the entrants carry into FME controlled areas. Many of the processes require authorized persons to also sign off on debris-generating tools before being allowed to enter the controlled areas. FME Sentry is configured to send immediate requests for authorization and receive replies to avoid the entrant from having to stop and go find the applicable authority for approval. For projects that are connected to the Internet, messages are sent to the authorized individuals' emails and smart phones, for example. For projects that are not connected to the Internet but that are connected to the customer's local area network, messaging is done via email, through an application, or other messaging service. For projects that have no connectivity, email messages and outbound text messages are delivered via the onboard mobile backup system. If no connectivity is available, the authorized entrant is instructed to go find the person authorized for the specific requirement. That authorized person, whom the FME kiosk can identify through entry of a code, or through sensors, can then provide the appropriate authorization.

In accordance with still further examples, when connected to sufficiently high speed Internet access, whether wired, wireless, cellular or otherwise, the FME Sentry system may push information up to the FME Sentry administrative system. Access to such system is provided to the project leadership and authorized individuals on a per-project basis, but optionally may be retrieved as necessary at a later date if stored. Functionalities and information pushed and presented can include for example, but is not limited to, and may be described elsewhere herein: (1) list of authorized entrants who are currently logged in and working in each controlled area, and/or which tools that person brought into the controlled area. This is particularly helpful when site personnel are looking for specific individuals; (2) a record of each authorized entrant's movement activities. This is also beneficial for onsite management personnel to discover where the person they are looking for last was and when they checked out of the applicable FME controlled area; (3) a list of all tools currently checked into each FME controlled area. This list includes the ability to search tools by name and by number. This is helpful to project engineers and to project supervision to discover where high value tools are being used so that they can quickly find them when needed in multiple FME controlled areas; (4) direction discrepancies: one advantage of the present disclosure is that it tracks the directional movement of all authorized entrants and of each and every foreign material carried into and out of FME controlled areas. This way, information is available which can confirm that no items are being left in machines, but also discover how often individuals are removing tools without checking them out of FME controlled areas, for example through communication with a tool crib. When the tool is checked into the tool crib(s), the system tracks the person that checked the tool into the tool crib and notes that it was not checked out of the applicable FME controlled area. This presents the opportunity for further training to assure workers are working to FME procedures; (5) select the cameras on the FME kiosks and view any of the one or more camera's view panes. The remote person can also view the logs for each of the video surveillance cameras, and any additional surveillance cameras distributed throughout the facility that are in communication with the FME kiosk; (6) when notified via email, text, via an application or otherwise on their network device, for example a smartphone or tablet, the remote authorized persons can approve new authorized entrants, approve transactions defined in various procedures and interact with the persons at the kiosk while sitting at their desks. This is viewed as another large time saver to assure FME accountability is achieved while also achieving FME procedural compliance; (7) select project management personnel will also use the system to schedule FME projects and to provide project-specific information.

In one embodiment, the project-specific information is taken and pushed to the FME kiosks once onsite and online prior to projects started. Such information may include: (a) company, project name, power generation unit number and FME controlled area, specific instructions, prompts, or questions, etc. This information may then also be printed on the project-specific forms when printing occurs per procedures; (b) identify onsite project leadership including day and night shift project managers, engineers, supervisors and anyone else authorized to sign off on various items as applicable; and (c) list of the actual workers assigned to the project and which FME controlled areas each person are authorized to enter; (7) inventory of rags, bags and FME barriers. These types of items are predominantly left in machines. All of these items are carefully labeled at the onset of projects that use the FME Sentry system. If any of these items are still present in a controlled area, the location may also be provided. This becomes important for both the onsite personnel and the remote management personnel to confirm that all such items are removed with a picture of the item taken upon removal to assure they are not left in the machine upon assembly. The FME Sentry system may also provide the feature of preparing reports related to tracking of initial items to final items. This report shows labeled items that were shipped at the onset of the project and compares it to the then current inventory of items checked into one of the FME controlled areas or the tool cribs. This becomes important to help identify tools that are missing prior to the end of projects and also helps identify the persons who last had the tools checked out.

In accordance with still further examples, the FME Sentry system also comes equipped with video surveillance cameras 114 that view all transactions conducted at the kiosk 100. These cameras can, for example, assure that the condition of each item is recorded when entering and exiting the FME controlled areas. Human behavior affects consistency. If the entrants do not follow the instructions of taking pictures of the tools as instructed, information may be unavailable to use downstream in the condition verification process. Thus, capturing all transactions via video increases the opportunity to capture the information. This is important as there are many operating experiences where the condition of a tool changed from when the tool was checked out of the tool crib and returned. Adding onboard video surveillance functionality 114 enables site management to verify whether such condition occurred while in use in one of our FME controlled areas. For projects where appropriately high speed Internet access is provided at the kiosk location, the onboard video surveillance system can also be accessed remotely. This enables technicians to assure that the on premise workers are using the system properly and to assist where applicable. Each FME kiosk may also be equipped with an onboard hard drive (e.g., via computer 120) that stores all transactions that occur at each kiosk for the duration of the project. In preferred embodiments, the hard drive is sufficiently large, such that it can hold video data. In various other embodiments, the kiosk may store information on a remote server, or in the cloud, or according to any other means. Where hard drives are used, this enables the benefit of having video surveillance to sites/projects where providing appropriately high speed Internet access is not possible.

In accordance with still further examples, unique item identification is provided. In order to assure accurate FME accountability, embodiments of the present disclosure use unique numbers on each and every item carried into and out of our FME controlled areas. This is important for verification that each and every identical item that enters in quantity is tracked and removed from FME controlled areas before the machines are reenergized. Operational experience has recorded multiple times where items such as tools and rags that cannot be accounted for at the conclusion of a project suddenly 'appear' as being found. Then, when the system is reenergized, the item that was lost is found in the damaged machine. One method contemplated by the present disclosure requires pre-lasered and recorded items. According to this embodiment, prior to the start of any given project, laser numbers generated by the system are be applied to customers' tools (using TYKMA Scorpion Galvo laser system, for example).

In accordance with still further examples, items may be easily added at the kiosk. For example, the FME kiosk guides workers carrying items into FME controlled areas through the process of labeling their tools/items being carried into the controlled area. In various embodiments, for example, this process consists of the FME Sentry system assigning the next available number, instructing the worker to write the number on their tool (using a marker at the kiosk), taking a picture of the item with the number showing along with pictures of all moving parts as applicable before entering the area. In other embodiments, another method of engraving or tracking may be used, providing the same benefits, for example including RFID tags, which may be provided at the Kiosk.

In accordance with still further examples, the FME system uses a unique number management strategy. All items entered into the system have a unique identifier. If a duplicate is registered, an error will appear, and a prompt will require that the item be re-registered. Depending on the maximum number of digits, for example where a 5 digit numbering scheme is used, the chance of having duplicate numbers increases across multiple subcontractors. The FME system accounts for this and its methodology of presenting both the item description and a picture of the item at the kiosk maximizes the opportunity for the worker to select the item actually being carried into the FME controlled area. In this way, re-registering or re-numbering may not be required. Further, in various embodiments, the tools or objects may be assigned a number length having a minimum of three and a maximum of five digits. In other additional embodiments a letter may be added to each item. In some cases, one or more characters may be added to the unique identifier to indicate source or sub-contractor. In further examples, the tools may be numbered beyond five digits, for example 10 digit codes may be used, and may include alphanumeric as well.

In accordance with still further examples, the system and method may enable numbering system correlations. The FME Sentry system enables, for example, the ability to receive large number blocks from customers' systems for use in the FME system when lasering numbers onto a customer's tools. For example, according to an embodiment, when lasering numbers onto a customer's tools, the system selects the next available number from the customer's provided list, marries it with the next available number from FME Sentry and lasers a pattern consisting of the FME Sentry number. A 2D or 3D barcode and the customer's serial number may also be added. Connectivity between the FME Sentry system, including the FME kiosk, allows for project-specific inventory downloads. For example, a numbering scheme according to the present disclosure, allows the FME kiosk to track tools entered into its system by each person and each company that each person is representing. This enables the FME system to load known tool databases into each kiosk at each project that only include the companies that will be performing work at such project. This way, tools that were labeled on previous projects can skip the step of re-labeling at the new project.

In accordance with still further examples, when tools are presented at the FME kiosk that do not have a number on them, the system walks the entrant through a process to assign the next available number from the FME Sentry system, and instructs the entrant to write the number onto the tool/item, or alternatively associate a tag, RFID chip etc. with the item, take a picture of the item with the number showing, take pictures of the moving parts as applicable and confirming the item before allowing the entrance into the controlled area.

In accordance with examples where a FME kiosk is used, the FME kiosk may be self-contained and shippable. According to various embodiments, this allows the FME kiosk to be shipped from project to project and mounted, for example, on customer provided scaffolding or elsewhere at the customer's location. The kiosk may also be able to accept project specific modules, including software instructions, or physical modules, which may be installed when the FME kiosk arrives on location.

In accordance with still further examples, the FME kiosk may comprise a self-contained waterproof system that uses a design consideration to manage heat and air flow of current and future commercially available video and network technologies all housed in the one kiosk. The kiosk may be designed so as to allow quick and easy access to each component on the inside to replace as needed and/or to enable simple swaps of technologies as they continue to emerge in a condensed structure designed for use in power generation outage projects. The FME kiosk may contain, for example, a processor, or mini-computer, a computer monitor, preferably an outdoor rated backlit computer monitor best rated for use in direct sunlight, and a key pad with color coded keys.

Figure 2:
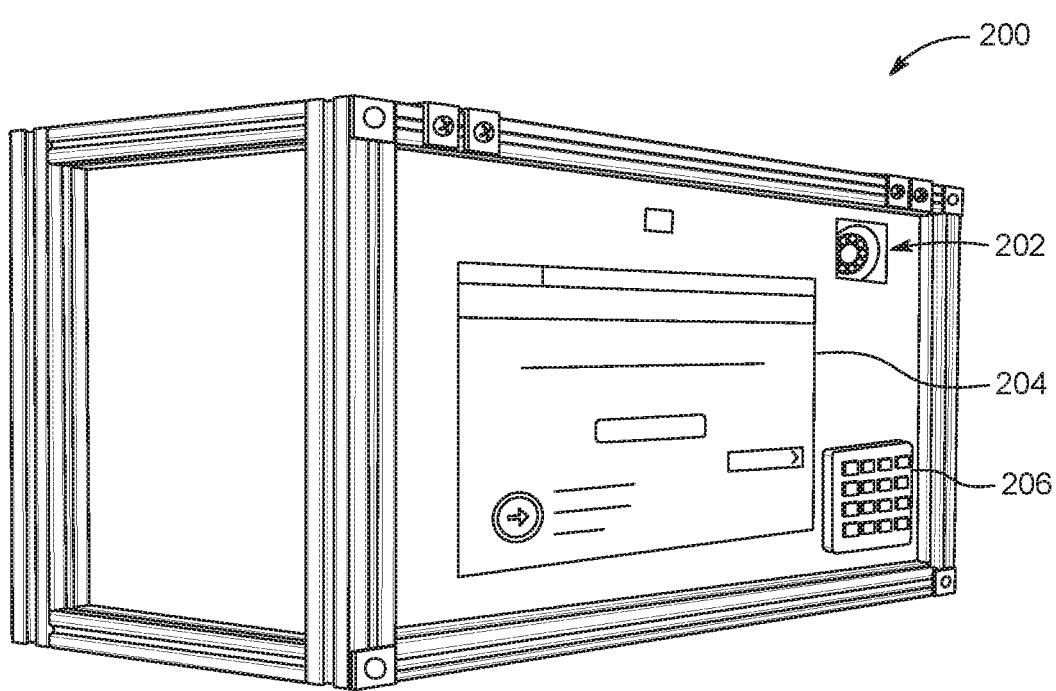
FIG. 2 illustrates different components present on front side of an FME kiosk 200, according to an exemplary embodiment.

In accordance with still further examples, FIG. 2 illustrates different components present on front side of an FME kiosk 200. The FME kiosk 200 may contain a camera 202, for example webcam(s) or other video camera(s), a display screen 204, and a user input device 206. The camera 202 may capture a picture of each person authorized to use the kiosk 200 and for use on video communications. In various embodiments, an additional webcam may be included. This additional webcam may have lights that operate in conjunction with the tool tracking system, video surveillance cameras and a third party providers' video system that captures all transactions conducted on the shelf below the upper cabinet and all that transpires in front of and on either side of the kiosk 200. Such information may be stored on a multi-terabyte system inside the kiosk 200, on the network and or remote access equipment and systems. In preferred embodiments, appropriate individuals have remote access to all systems in the kiosk 200.

In accordance with still further examples, the FME kiosk may include a router selected for use with a wired internet connection. In various embodiments, the FME kiosk may also defaults to cellular connectivity when the wired internet connection fails or is not available, or may use multiple connection if connectivity speeds so require. The FME kiosk may also include Industrial-grade power-over-Ethernet (PoE) hubs. The hubs may power the surveillance cameras and serves as the hub for all the devices to communicate via the local area network to the kiosk's onboard computer via the onboard router.

In accordance with still further examples, the FME kiosk may also be equipped with an operating system, or software, that gives remote FME professionals full visibility to the screens that the worker on premise is seeing along with the entries being made to the system on premise.

In accordance with still further examples, the FME kiosk may also be configured to promote remote supportability. All devices with external visual indicator lights may be positioned behind windows visible from the outside of the cabinet such that remote centralized FME professionals can guide onsite workers to relay the visible colors and lights.

In accordance with still further examples, the FME kiosk also may include an onboard temperature monitoring system with external visible indicators. This system may activate, for example, cooling fans that are also part of the kiosk when the internal temperature reaches/exceeds a certain threshold, for example, 85 degrees Fahrenheit.

In accordance with still further examples, the FME kiosk also may include a separate cooling system for projects in high temperature areas. The main equipment cabinet may be configured to ship and be used with or without the cooling system. The unit that is shipped to accommodate the cooling system includes mounting brackets on either side that the cooling unit mounts to.

In accordance with still further examples, the FME kiosk also may include a tool shelf and or a locking drawer unit. The unit may be mounted on customer-provided scaffolding beneath the upper cabinet. A lower portion of the unit may also house an RFID reader. A flexible cord or housing may contain all wiring between various parts of the FME Kiosk and use standard plugs using color-coded connectors to simplify setup.

In accordance with still further examples, the FME kiosk also may include an external uninterrupted power supply/battery backup unit. The unit may be located, for example, on the floor under the shelf. The unit may plug into power provided by the customer and the cord from the unit above plugs into the UPS system.

Figure 3:
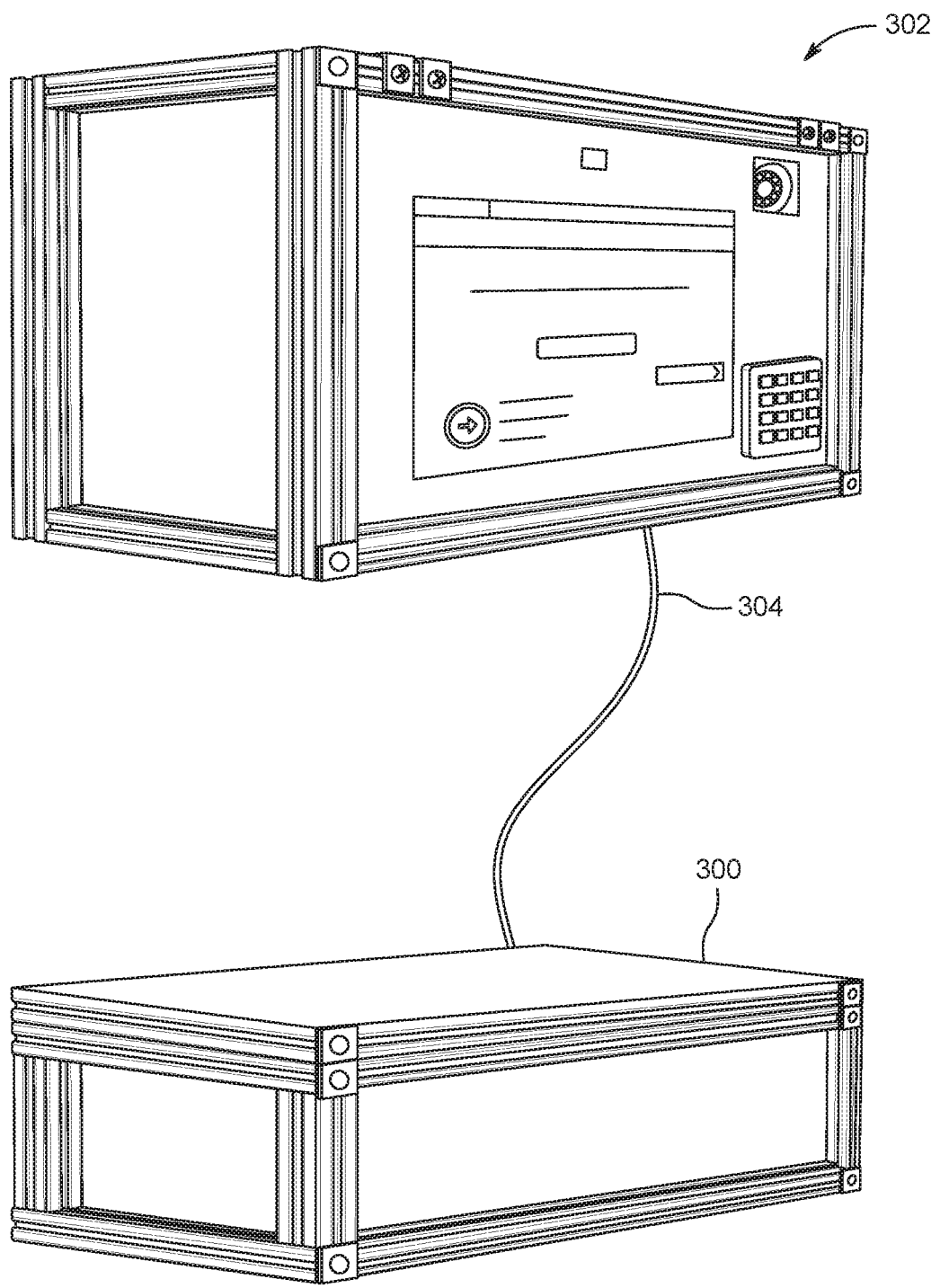
FIG. 3 illustrates a tool shelf 300 connected with a main equipment cabinet 302 using a protected cord 304, according to an exemplary embodiment.

In accordance with still further examples, the FME kiosk also may include or be built on the 80/20 Industrial Erector system, a carbon 3D printed kiosk, or a custom developed plastic shipping container similar to a Pelican or SKB case. According to various embodiments, the FME kiosk has three primary parts that all fit together to form an enclosed shippable container. Once at the job site and ready for use, the front is unlatched and swings upward on hinges and is held in place using provided hardware. A tool shelf 300 may also unclasp from the bottom of the shippable unit and be mounted below the main equipment cabinet 302 with a protected cord 304 or housing between the two units, as illustrated in FIG. 3.

In accordance with still further examples, remote FME Sentry support is incorporated. In various embodiments, FME kiosks may be monitored by centrally located FME accountability technicians. Preferably, the FME accountability technicians are trained. FME accountability technicians may, for example: (1) monitor the connectivity of the kiosks that are part of each of their assigned projects, (2) monitor all transaction events of the workers. Technicians may be able to see, for example, the actual screens being selected by the authorized entrant and use a texting window when applicable, (3) interact with the workers using the FME kiosk using the method preferred by the user including: (a) the telephone handset mounted on the wall next to and/or as part of the FME kiosk. When the user lifts the handset a call is immediately established to the assigned FME professional assigned to the specific project, and (b) the worker's own mobile telephone by calling or texting the number provided on the kiosk. Once such number is dialed from the site, the call or text is automatically routed to the person(s) assigned to the specific project, (4) interact with site management if/when the workers are not using the system as defined in our procedures, (5) coordinate trouble isolation and correction with pre-designated site personnel.

In accordance with still further examples, integrated personal items locker are incorporated into the FME system. Personal items including cellular telephones, watches, jewelry, wallets, change, etc., are normally not allowed into any FME controlled area. The current practice is to provide cubbie cabinets near FME controlled areas. An integrated locker system may also be integrated into the FME Sentry system, in one embodiment.

In accordance with still further examples, integrated personal items locker perform, for example, such that when an authorized entrant scans their hard hat at the kiosk in front of the locker system, the FME Sentry system assigns an open locker to the authorized entrant and unlocks the applicable door for a designated period of time. The authorized entrant then places their personal items in the locker and closes the door. In further examples, the system may control access to the locker. For example, when the authorized entrant is inside the FME controlled area his/her locker cannot be opened. When the authorized entrant exits the FME controlled area, they are given the option of accessing their assigned locker. If no access is necessary, their items remain in the locker. Should the site encounter a loss of power, a master key will also unlock the lockers.

In accordance with still further examples, RFID-enabled items are used in FME controlled areas. One of the ways to increase traceability of items used in controlled areas is to affix Radio Frequency Identification (RFID) tags to select items. One concern with RFID tags is ensuring the tag is reliably affixed. If an RFID tag affixed to an item falls off while being used say in a generator rewind project, the tiny metal tag could create an arch and burn up the generator once re-energized.

An example of a RFID-enabling item that could be used in FME controlled areas includes RFID-enabled tool fall protection devices. Tool tethers may be affixed to tools using heat shrink, a self-vulcanizing tape and duct tape. The tool tether may be affixed to a tool and may be used in conjunction with a lanyard and a wrist cuff. In one case, the RFID tags may be embedded into a hollow version of the tether, lanyard and wrist cuff. Embedding the RFID into a hollow version of the tether overcomes concerns with RFID tags becoming dislodged.

Another example of a RFID-enabling item that could be used in FME controlled areas, may include an RFID-enabled tool tether and lanyard. Hollow nylon strapping material, or any other suitable material, may be used to hold any commonly sized RFID tag inside the material used to construct a tool tether and tool lanyard. This leverages an existing practice, tool tethers and tool lanyards, and serves as the method to house the tracking mechanism. One additional advantage that an RFID-enabled tool tether may bring is that the thickness of the material provides a greater lip on the folded material side that has reduced failures due to the tool slipping out from under the tape used to affix the tether to the tool.

In other embodiments, a tool tether may be constructed with nylon (plastic) D-rings. This may have benefits in, for example, the radiologically controlled area of a nuclear power plant. In one case, a Nylon RFID-enabled tool tether may fold the end holding the D-ring to the tether under itself before sewing. This may prevent the ends from becoming frayed during use.

Wrist cuffs, according to embodiments, may be constructed using Velcro® to size the cuff to the proper sizing for each person. Alternatively, or additionally, an elastic material may be used to assure that the cuff comes off of the person before causing them to fall in the event that the lanyard gets caught on anything mobile. Another example of a RFID-enabling item that could be used in FME controlled areas includes a wrist cuff with a lanyard attached. This cuff makes it easier to switch between tools when working over holes or other workers.

Another example of a RFID-enabling item that could be used in FME controlled areas includes RFID-enabled plastic bags. In various embodiments, RFID-enabled plastic bags are constructed such that the RFID tag is embedded between plastic layers of the bag itself. The FME system can require that it be the only type of plastic bag carried into controlled areas.

RFID-enabled plastic bags designed for use in embodiments of the current disclosure benefit from having the RFID tag embedded between two layers of the plastic itself. This may help to overcome the concern of an RFID tag becoming dislodged.

Another example of a RFID-enabling item that could be used in FME Controlled Areas includes RFID-enabled rags or towels. RFID-enabled rags may comprise a rag where an RFID label tag is sewn into cotton rags used in power generation projects. The FME system may require that customers use the appropriate RFID enabled rags.

Figure 4A:
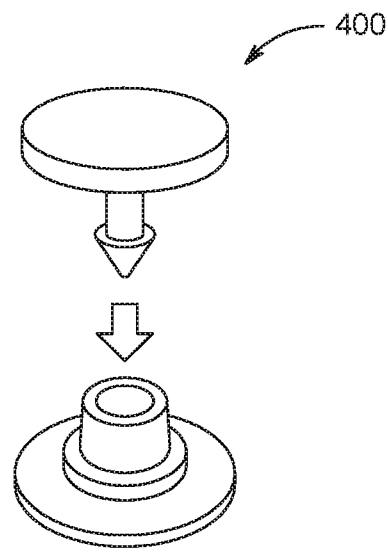
FIG. 4A and FIG. 4B illustrates two designs of RFID enabled top snaps, according to an exemplary embodiment.
Figure 4B:
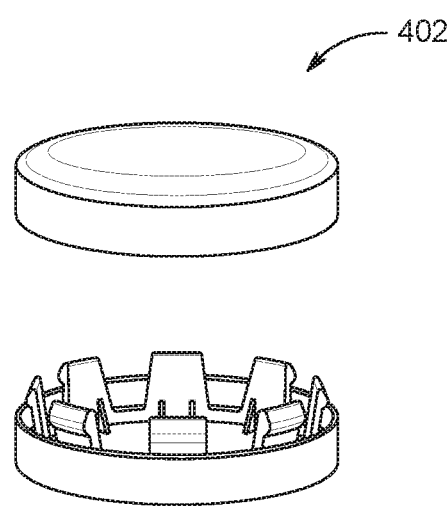
Figure 4C:
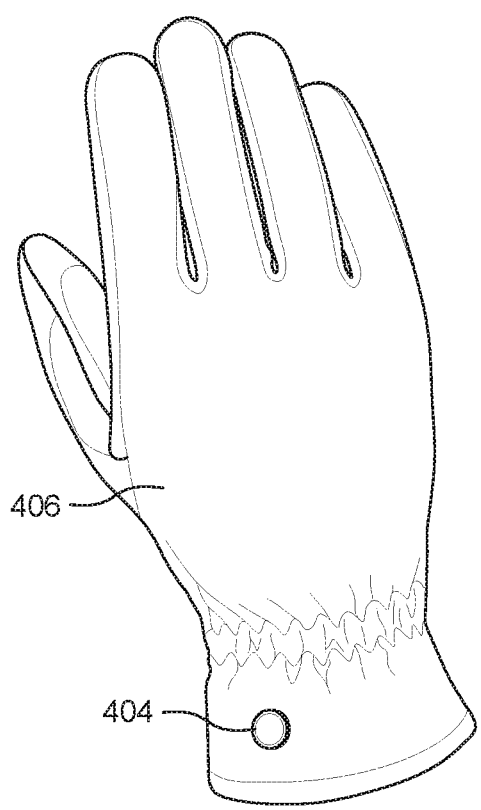
FIG. 4C illustrates an RFID enabled snap 404 attached to a glove 406, according to an exemplary embodiment.

Another example of a RFID-enabling item that could be used in FME controlled areas includes a more generic FME SentryTag. A SentryTag may allow users to reliably RFID-enable cloth, leather and flexible plastic items in the field for projects. Items that may be RFID-enabled may include, for example, gloves, rags, cloth FME bags (used as barriers), Scotch-Brite pads, various soft plastic tools, and many other items used by the power generation industry. FIG. 4A and FIG. 4B illustrates two designs of RFID enabled top snaps i.e. a first top snap 400 and a second top snap 402 that may allow one to affix an RFID solution to materials in the field. FIG. 4C illustrates an RFID enabled snap 404 attached to a glove 406. Similarly, the RFID enabled snaps could be attached to other items carried by the used in the restricted area. This embodiment allows numerous products to be used according to the embodiments and systems described herein. One embodiment would allow for use of an RFID-enabled top portion of a common garment snap. SentryTags may be made available, along with, optionally, instructions on installing them, at a FME kiosk, for example.

According to this example, an RFID label chip may be placed inside of a plastic snap, for example during the plastic injection molding process. The material of the plastic snap should be strong and resilient to chemicals used on power plant project. When applied to any of the materials above, the items becomes trackable and used in conjunction with the FME Sentry system.

In some aspects, the described systems and techniques may track the entrance and exit of items to a controlled space or area using multiple inventory, tracking, and access techniques and features, to ensure accuracy and redundancy. As described above, the multiple inventory techniques may include inventorying items using a unique ID, such as RFID, bar code, laser etched ID, etc., taking images or video of the items and storing them in a database of items for an additional level of identity verification, weighing or taking other physical measurements of the items to monitor condition of the item/ensure nothing was removed from the item while in a controlled area, etc. In some cases, kiosks may be equipped with laser etching equipment, RFID tags, etc., to enable tagging of items at the kiosk itself, to ensure a high level of procedure compliance and more thorough inventory of items.

The tracking techniques may include any or a combination of registering locations of items based on check-ins or scans of the item at kiosks, access requests to controlled areas at kiosks, using cameras to capture and track movement of items or users associated with or registered to an item, etc. These techniques may include or be augmented by GPS, dead reckoning, location determination based on network access (e.g., location of nearest access point to a network), or a combination thereof. In some cases, location determination and/or tracking may be accomplished through registering or associating an item with a user/device associated with a user. The user's device may then be tracked, for example using GPS, dead reckoning, etc., to then verify, confirm, or determine in the first instance, a location of an item.

The access techniques may include restricting access to controlled areas via gates, locking doors, etc., such that access may only be granted upon current inventory of an item or items entering the controlled area. Similarly, upon exit of a controlled area, inventory may again be taken before enabling other features at a kiosk, for example. Requiring inventory of items at key entry and exit points before enabling other features of the FME system may better ensure that inventory is taken and procedures are properly followed. In some cases, access control may additionally or alternatively include restricting access to a tool crib or container (to retrieve items to enter a controlled area or to store items after use), restricting access to one or more systems of a kiosk prior to inventory of items being taken, etc.

By combining one or more of the above inventory, tracking, and access features, a more robust and reliable FME system may be realized. In some aspects, two or more, or all of the above-described features may be combined to yield a fully integrated item inventory, tracking, and access solution that addresses problems in the prior art of inefficient accounting for items, unreliable tracking of items, down time of plants caused by items left in controlled areas, and so on.

In some examples, operation of the system may include associating an ID with an item and storing the ID and a name of the item in an inventory database. In some aspects, this may also include storing other identification information, including images, video, device specifications, and/or other information to enable a higher degree of certainty in identification of the item. Operation of the system may further include restricting access to a controlled area until completion of an inventory check-in (e.g., scan, manual entry, etc.), for example, at a kiosk, prior to entry to a controlled area. The location of the item(s) may then be tracked, using kiosk check-ins, GPS, video, and/or other location determination techniques. In some aspects, for example, when a controlled area has limited network connectivity, some location tracking techniques may be disabled, to reduce power consumption, which may be particularly relevant when utilizing capabilities of a user's device (e.g., smartphone) to aid in determining the location of an item. Access to the system, for example, via a kiosk, may also be restricted upon detection of a user leaving a controlled area (or upon elapse of a given, configurable time period, upon detection of a door opening that grants access to and from the controlled area, etc.), until completion of one or more inventory tasks.

While various embodiments and examples of the disclosure have been illustrated and described, as noted above, many changes can be made without departing from the spirit and scope of the disclosure. For example, the method and system may be used outside of the power plant industry. Accordingly, the scope of the disclosure is not limited by the preferred embodiment.

In an aspect, FIGS. 5 through 9 illustrate flowcharts of a method of foreign material accountability within a restricted area. The flowcharts of FIGS. 5 through 9 show the architecture, functionality, and operation for a method of foreign material accountability within a restricted area. In this regard, each block may represent a module, segment, or a portion of code, which comprises one or more executable instructions for implementing the specified logical function(s). It should also be noted that in some alternative implementations, the functions noted in the blocks may occur out of the order noted in the drawings. For example, two blocks shown in succession in any of the FIGS. 5 through 9 may in fact be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

Figure 5:
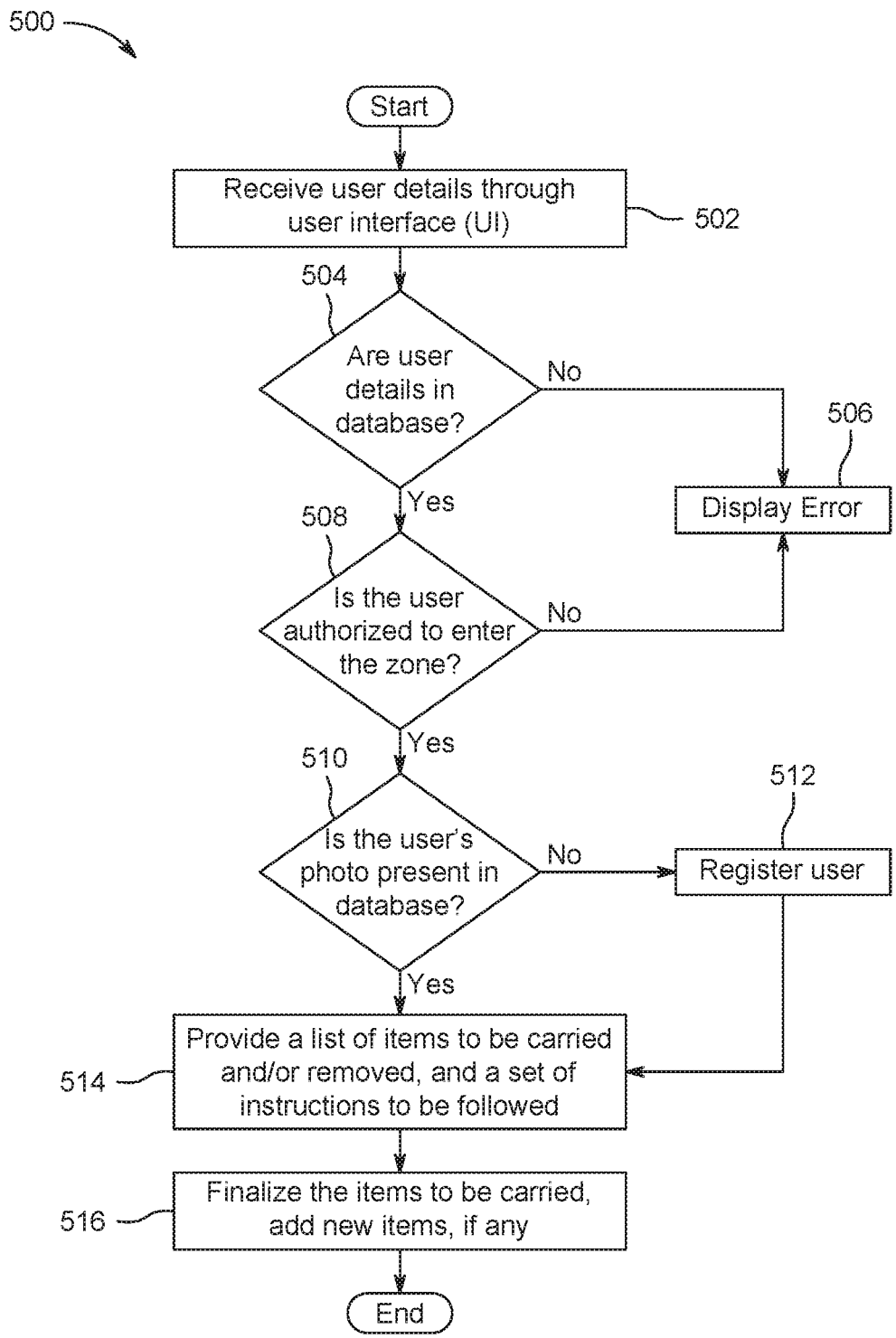
FIG. 5 illustrates a flowchart depicting a method 500 for authenticating a user entering a restricted area, according to an exemplary embodiment.

FIG. 5 illustrates a flowchart depicting a method 500 for authenticating a user entering a restricted area. In an embodiment, the authentication is done at a kiosk comprising a display screen, input keypad, and a plurality of sensors, while a user tries to enter in a restricted area. At first, user details may be received through a user interface (UI) provided by the display screen of the kiosk, at step 502. In one case, the user details may include a user name, employee ID, designation, department, and the like. Successively, it may be determined if the user details are present in the database at step 504. An error message may be provided to the user while the user details are not found, at step 506. Alternatively, while the user details are found, it may be determined if the user is authorized to enter a concerned zone i.e. the restricted area, at step 508. An error message may be displayed to the user while entry of the user is found to be unauthorized, at step 506. Alternatively, if entry of the user in the zone is found to be authorized at step 508, it may be determined if the user's photo is present in the database, at step 510. In case the user's photograph is not found to be present, the user may be asked to register himself, at step 512. Alternatively, if the user's photograph is found to be present, a list of items and a set of instructions to be followed while entering in the zone may be provided to the user, at step 514. The list of items may correspond to the items that are to be carried and/or removed while entering the zone. Thereafter, the items to be carried by the user may be finalized by allowing the user to add new items, at step 516.

Figure 6:
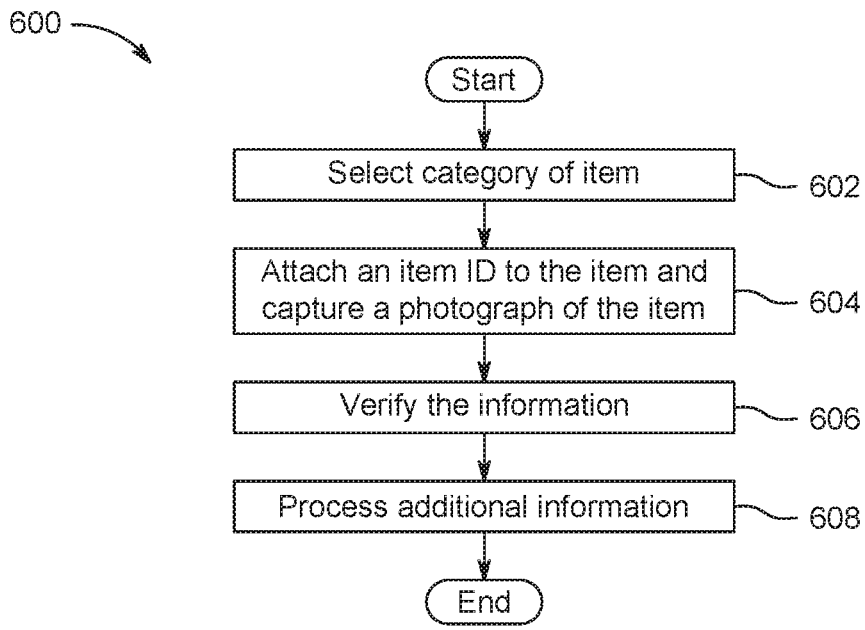
FIG. 6 illustrates a flowchart depicting a method 600 for adding unmarked items to be carried by the user, according to an exemplary embodiment.

FIG. 6 illustrates a flowchart depicting a method 600 for adding unmarked items to be carried by the user. Using the kiosk, category of an unmarked item may be selected by the user, at step 602. The category of unmarked item may correspond to a closest match of category related to the unmarked item. In one case, such categories may include tools, label, bag, safety, and the like. Upon obtaining the category of item, an item ID may be attached to the item, and a photograph of the item may be captured, at step 604. Thereafter, the information corresponding to the item may be verified, at step 606. For example, information corresponding to the item may be edited. Successively, additional information related to the item may be processed, at step 608.

Figure 7:
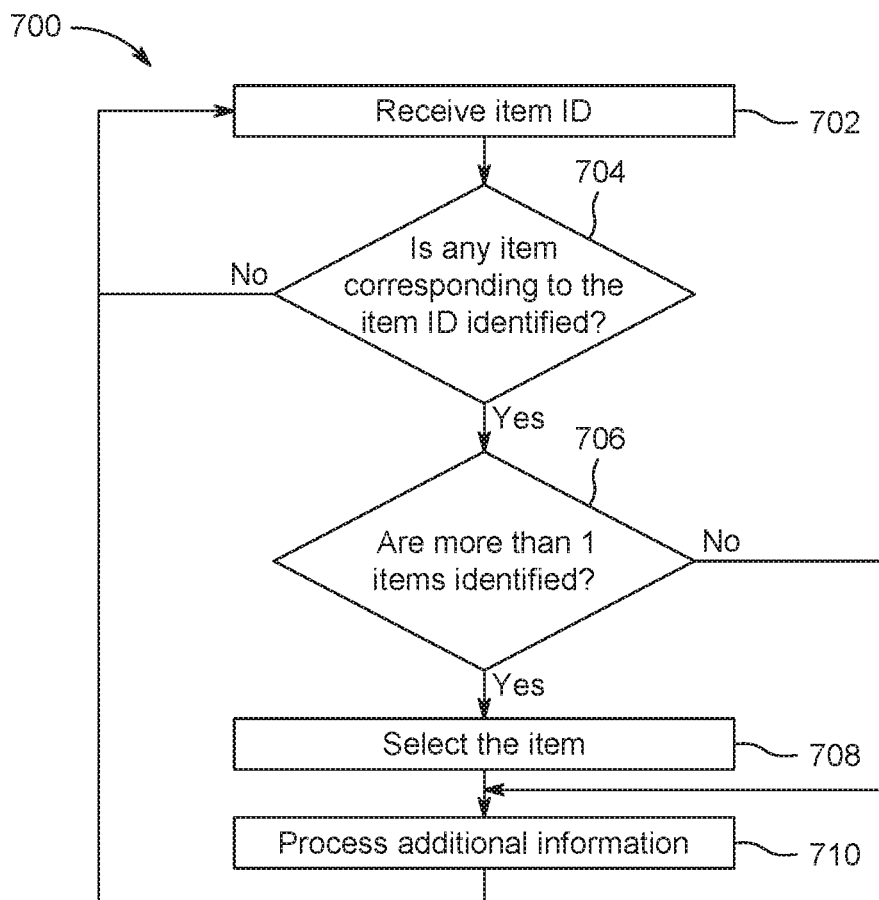
FIG. 7 illustrates a flowchart depicting a method 700 for identifying items through item ID, according to an exemplary embodiment.

FIG. 7 illustrates a flowchart depicting a method 700 for identifying items through item ID. At first, an item ID related to an item needed to be carried by the user may be received from the user, at step 702. Post receiving the item ID, any item corresponds to the item ID may be determined, at step 704. While no such item is identified, a new item ID may again be asked from the user, at step 702. Alternatively, it may be verified if more than one item is identified, at step 706. While more than one item is identified, the user may be asked to select one of such items, at step 708. After a single item corresponding to the item ID is identified, additional information related to the item may be processed, at step 710.

Figure 8:
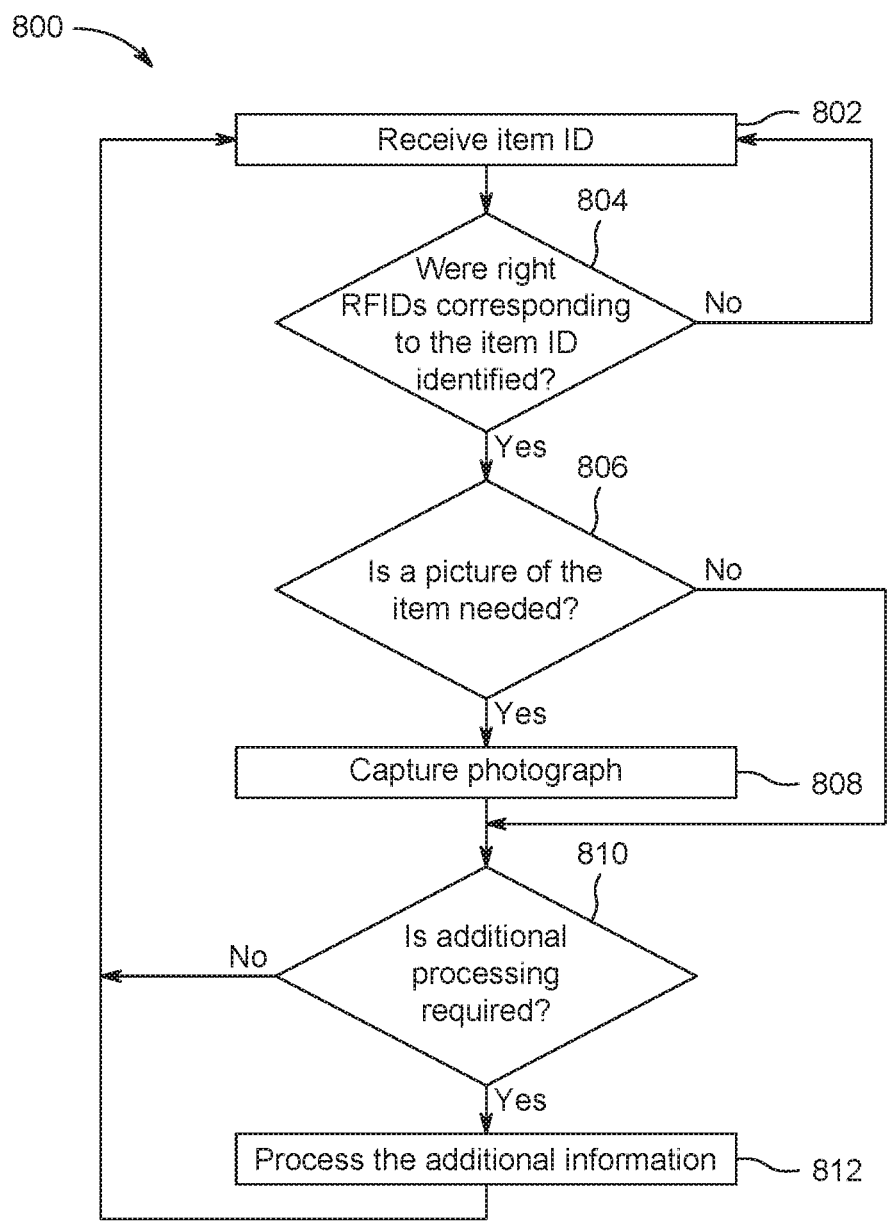
FIG. 8 illustrates a flowchart depicting a method 800 for identifying items through Radio-Frequency Identification (RFID), according to an exemplary embodiment.

FIG. 8 illustrates a flowchart depicting a method 800 for identifying items through Radio-Frequency Identification (RFID). At first, an item ID may be received, at step 802. Successively, it may be determined if right RFIDs corresponding to the item ID are identified, at step 804. For example, right RFIDs corresponding to the item ID may include count of the items, as well as correct RFID corresponding to the item ID. While right RFIDs corresponding to the item ID are not identified, a correct item ID may again be asked from the user, at step 802. Alternatively, while right RFIDs corresponding to the item ID are identified, it may be determined if a picture of the item is needed, at step 806. In case a photograph of the item is needed, the photograph may be captured, at step 808. While the photograph of the item is gathered, it may be determined if addition processing is required, at step 810. If required, the additional information may be processed, at step 812, else a new item ID may be asked from the user.

Figure 9:
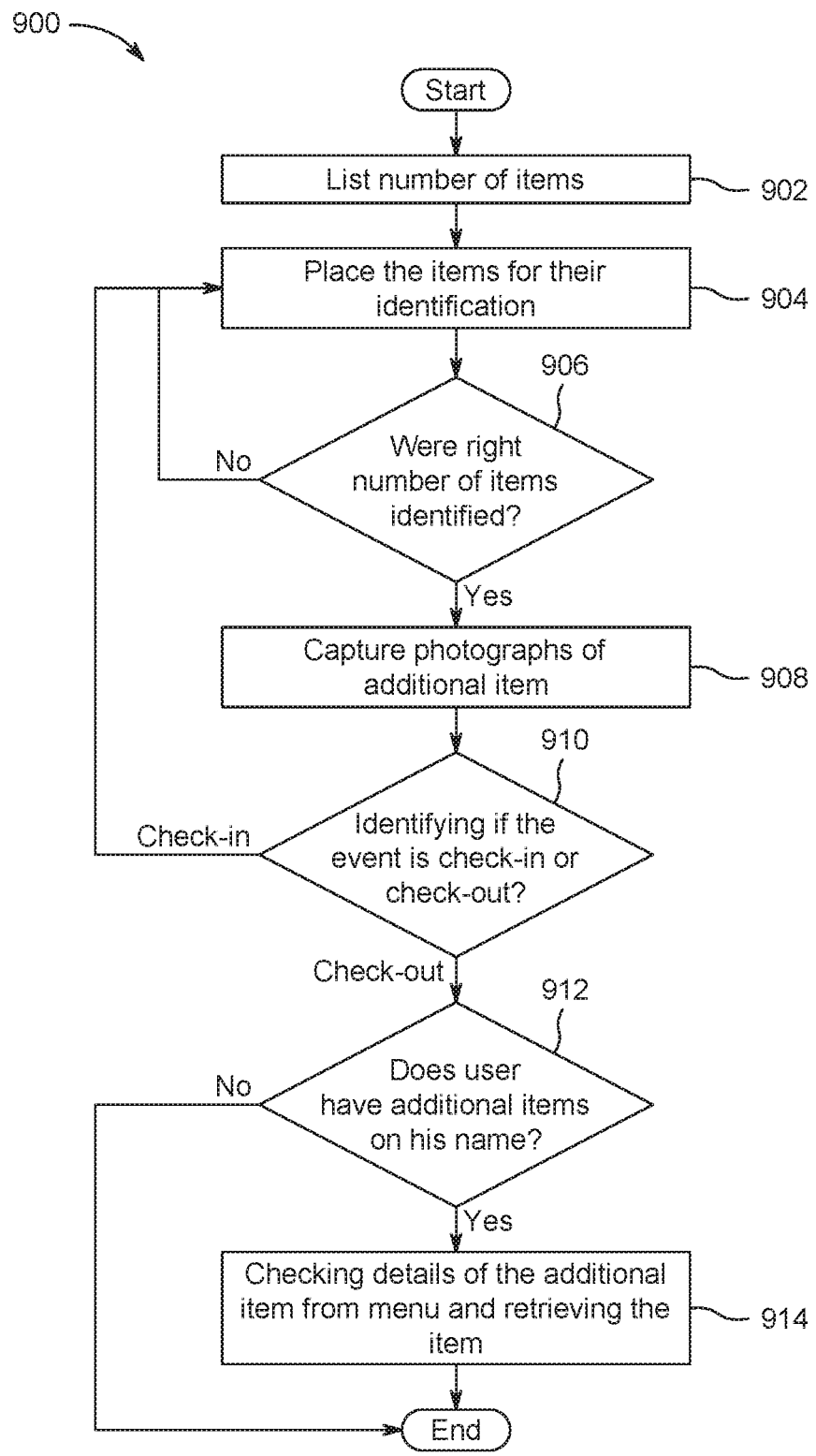
FIG. 9 illustrates a flowchart depicting a method 900 for scanning items during check-in or check-out from the zone i.e. the restricted area, according to an exemplary embodiment.

FIG. 9 illustrates a flowchart depicting a method 900 for scanning items during check-in or check-out from the zone i.e. the restricted area. At first, the user may be asked to list a number of items, at step 902. The items may need to be placed at a scanning area for identification, at step 904. Successively, it may be determined if right number of items are identified, at step 906. If right number of items are not identified, the items may again be needed to be placed on the scanning area, at step 904. While right number of items are identified, photographs of additional items may be captured, at step 908. Thereafter, it may be determined if the event is a check-in event or a check-out event, at step 910. In case of a check-in event, the items may need to be placed at the scanning area for their identification, at step 904. In case of a check-out event, it may be determined if the user has additional items in his name, at step 912. If the user is found to have additional items in his name, details of the additional items may be checked from menu and the additional item may be retrieved before check-out, at step 914.

While various embodiments and examples of the disclosure have been illustrated and described, as noted above, many changes can be made without departing from the spirit and scope of the disclosure. For example, the method and system may be used outside of the power plant industry. Accordingly, the scope of the disclosure is not limited by the preferred embodiment.

Embodiments of the present disclosure may be provided as a computer program product which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions (e.g., computer programming code such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A system for foreign material accountability, comprising:
   a kiosk, the kiosk further comprising:
   a display screen that is touch enabled;
   a user input device, wherein the user input device comprises a pin pad;
   one or more sensors, wherein the one or more sensors is selected from a group consisting of temperature sensors, RFID sensors, IR sensors, optical sensors, iris sensors and one or more cameras;
   a processor;
   a data bus coupled to the processor; and
   a computer-usable medium embodying computer code operating on the kiosk, the computer code comprising programmed instructions executable by the processor to control accessibility of items into a restricted area based on data received from at least one of the display screen operated by a user, the user input device, and the one or more sensors,
   wherein the kiosk is connected to a plurality of other kiosks through a cloud server for centrally controlling accessibility of the items into the restricted area, and wherein the cloud server is configured to:
   retrieve information comprising authorized profiles, security rules, and project details from the plurality of other kiosks, wherein the plurality of other kiosks are located at all entry and exit points of the restricted area; and
   enable accessibility of the items into the restricted area based on the retrieved information.

2. The system of claim 1, wherein the display screen provides a User Interface (UI) for allowing the user to provide authentication information, and receive notifications regarding the items.

3. The system of claim 1, wherein the pin pad is an alphanumeric pad having color coding.

4. The system of claim 1, wherein accessibility of the items into the restricted area is controlled by:
   authenticating the user based on the data received from at least one of the display screen operated by the user, the user input device, and the one or more sensors, wherein the authenticating comprises comparing the data with authorized profiles and security rules;
   tracking the items within, and while entering and leaving the restricted area; and
   notifying, the user, based on the tracking of the items.

5. The system of claim 1, wherein the kiosk is mounted on a foldable frame for allowing portability of the kiosk.

6. The system of claim 1, wherein the kiosk and the plurality of other kiosks are connected with and control operation of one or more electronic door latches present on the entry and exit points of the restricted area.

7. The system of claim 4, wherein the kiosk is connected to alarms installed in the restricted area, and wherein the kiosk sets off the alarms while an unauthorized user or an unidentified item enters into the restricted area.

8. The system of claim 1, wherein entry of the items is allowed into the restricted area upon identification of unique numbers or codes engraved onto the items.

9. The system of claim 1, wherein the kiosk reads RFID tags attached with the items for tracking movement of the items and the user carrying the items.

10. The system of claim 9, wherein the RFID tags are attached with the items using tool tethers or lanyards.

11. The system of claim 1, wherein the user is allowed to enter into the restricted area after a photograph of the user is captured and a unique symbology attached to a clothing of the user is identified.

12. The system of claim 1, wherein the unique symbology attached to a clothing of the user is one of an RFID tag, a decal, a barcode, and a Quick Response (QR) code.

13. The system of claim 12, wherein the decal, the barcode, and the Quick Response (QR) code are LASER engraved on the items.

14. The system of claim 1, wherein the kiosk is connected with a tool crib integrated with sensors, and wherein the sensors determine and communicate to the kiosk about submission of a tool bought out of the restricted area by the user.

* * * * *